United States Patent
Langmantel

[19]

[11] Patent Number: 6,138,015
[45] Date of Patent: Oct. 24, 2000

[54] MULTI-CELL RADIO SYSTEM WITH PBX PERIPHERY ASSEMBLIES

[75] Inventor: Ernst Langmantel, Vienna, Austria

[73] Assignee: Siemens Aktiengesellschaft, Munich, Germany

[21] Appl. No.: 08/705,715

[22] Filed: Aug. 30, 1996

[30] Foreign Application Priority Data

Aug. 30, 1995 [DE] Germany .......................... 195 31 999

[51] Int. Cl.$^7$ .................................................. H04Q 7/20
[52] U.S. Cl. .......................... 455/432; 455/445; 455/428; 455/436; 455/440
[58] Field of Search .................................. 455/432, 445, 455/433, 440, 412, 414, 435, 428; 370/328, 329, 338, 349, 522, 524

[56] References Cited

U.S. PATENT DOCUMENTS

| | | | |
|---|---|---|---|
| 5,343,512 | 8/1994 | Wang et al. | 455/410 |
| 5,428,822 | 6/1995 | Helenius et al. | 455/54.1 |
| 5,440,613 | 8/1995 | Fuetes | 455/555 |
| 5,542,094 | 7/1996 | Owada et al. | 455/54.1 |
| 5,655,001 | 8/1997 | Cline et al. | 455/422 |
| 5,666,398 | 9/1997 | Schiffel et al. | 370/280 |

FOREIGN PATENT DOCUMENTS

| | | |
|---|---|---|
| 0 583 137 A2 | 2/1994 | European Pat. Off. . |
| WO 94/16531 A1 | 7/1994 | Germany .......................... H04Q 7/04 |
| WO 94/16531 | 7/1994 | WIPO . |

*Primary Examiner*—Daniel S. Hunter
*Assistant Examiner*—Yemane Woldetatios
*Attorney, Agent, or Firm*—Hill & Simpson

[57] ABSTRACT

The multi-cell radio system is used in a communication system with at least one exchange (PBX) that has periphery assemblies (SLMC) and/or external radio exchange units (RE 1, RE 2) for the connection of base stations (B). Each mobile terminal equipment (ME) is allocated to exactly one port of a periphery assembly and/or radio exchange unit on the basis of an identification information specific to the terminal equipment. Radio connecting paths to or, respectively, from mobile terminal equipment (ME) can be produced such that, regardless of the location of the terminal equipment, they always ensue with an auxiliary ("extension") connection via the port of the periphery assembly and/or radio exchange unit allocated to it. The periphery assemblies (SLMC) and/or radio exchange units (RE) are configured to package the signaling messages from and to the terminal equipment in user-to-user information of a digital connection.

6 Claims, 3 Drawing Sheets

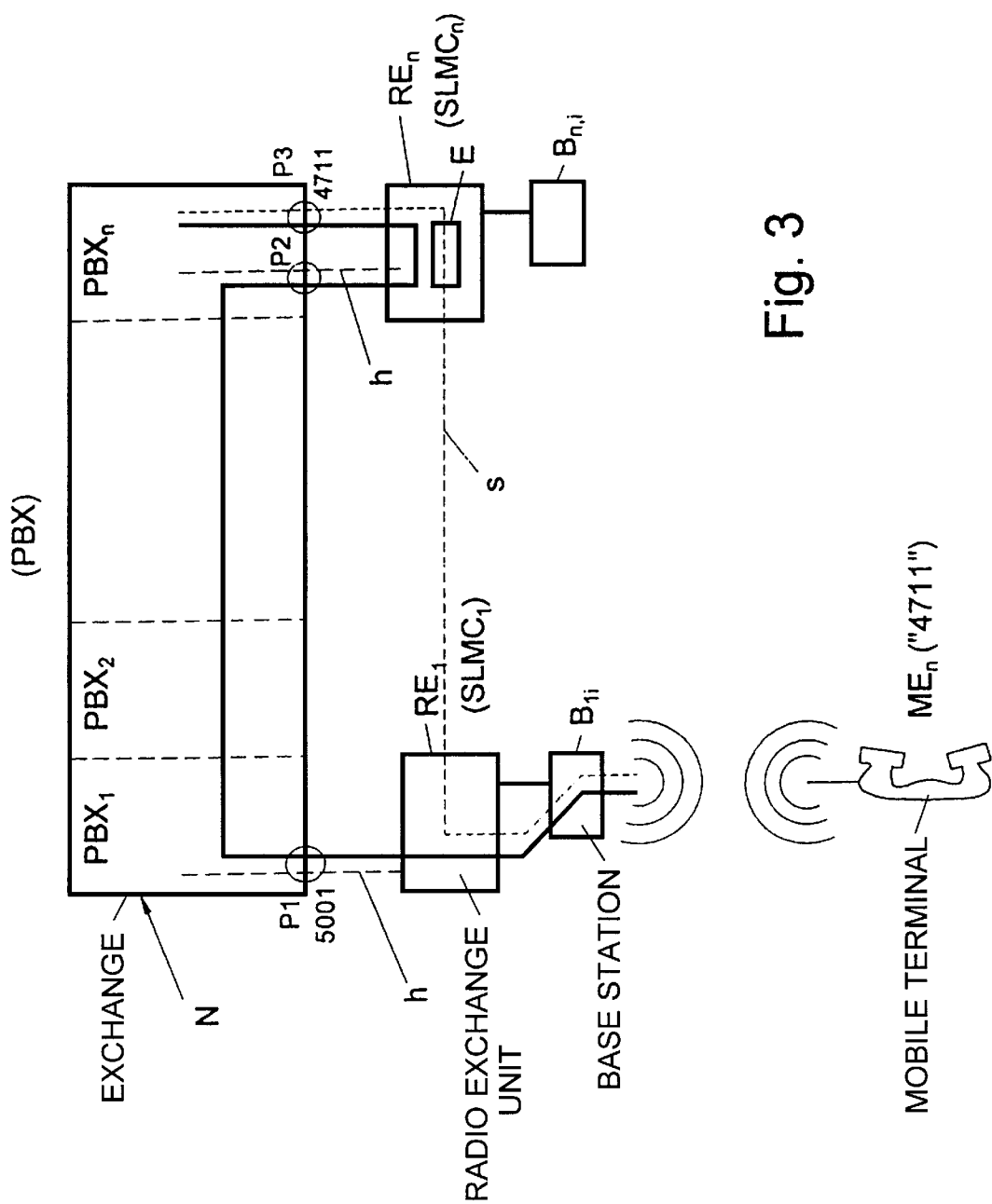

MULTI-CELL RADIO SYSTEM WITH PBX PERIPHERY ASSEMBLIES

BACKGROUND OF THE INVENTION

The present invention is directed to a multi-cell radio system for a communication system with exchange systems that have periphery assemblies and/or external radio exchange units for the connection of base stations. Each mobile terminal equipment is allocated to exactly one periphery assembly and/or radio exchange unit on the basis of an identification information specific to the terminal equipment. Radio connecting paths to or, respectively, from mobile terminal equipment can be produced such that, regardless of the location of the terminal equipment, they always ensue via the periphery assembly and/or radio exchange unit allocated to it.

In systems of this type, one or more base stations for mobile terminal equipment (cordless telephones) as well as, usually, for fixed terminal equipment are allocated to each exchange system.

The switching-oriented software that realizes the subscriber performance features usually runs in one or more central computer assemblies of the switching systems. The wire-bound terminal equipment are thereby connected via periphery assemblies with their own processor. The software of the periphery assemblies thereby does not realize and switching-oriented performance features of the system but is responsible for the hardware/software conversion, for example typically layer 1 and layer 2 according to the ISO OSI 7-layer model given digital interfaces.

Given carrier frequencies in the 900 Mhz or, respectively, 1.9 GHz range and standard, medically compatible transmission powers, the efficient region of a base station in buildings is limited to an ambience of approximately 20–50 m (see ETSI Standards CT 1, CT 2, DECT). This ambience that is supplied by a base station is called "cell". In practice, for example in a company building, this ambience or region does not meet the mobility demands, so that a switching system has a plurality of base stations.

There is a demand that each terminal equipment, both in its quiescent condition as well as in its activated call condition, can be arbitrarily moved between the radio cells of every switching exchange, as well as, within a network of switching exchanges. The mobility of the mobile terminal equipment in the quiescent condition is referred to as "roaming" in the technical jargon and the mobility in the activated call condition is referred to as "handover".

PCT reference WO 94/16531 discloses a system of the type wherein the control program in the radio exchange units sees to it that the telephone connections of a mobile terminal equipment ensue via the radio exchange unit allocated to the mobile terminal equipment regardless of its location. External radio exchange units are thereby employed. Another realization is disclosed by PCT/EP92/00418 reference, whereby a periphery assembly is employed as server instead of the external radio exchange units, this periphery assembly (just like the external radio exchange unit) simulating the connection of terminal equipment types known to the switching system via fixed connections (ports).

If the mobile terminal equipment participating in the telecommunication connections are to have the performance features allocated to them in their originating switching system available to them unrestricted and independently of location in the entire efficient region of all base stations, then the demand derives that a signaling connection between the "home" radio exchange unit and the terminal equipment must be set up and maintained in addition to the voice channel connection disclosed by PCT reference WO 94/16531.

It is thereby important that the signaling information of a mobile terminal equipment, for example dialed numbers, pressing the signal key, etc., always proceed into the "home" exchange system via the simulated "personal" port independently of the momentary location of the mobile terminal equipment. Only in this way is it assured that the mobile terminal equipment is supplied with its authorizations, for example direct access, personal, centrally stored abbreviated dialing destinations, etc., that is, with what is referred to as its "user profile".

Signaling information of a mobile terminal equipment that is relevant for the switching system must thereby be converted by the radio exchange unit into the protocol of the wire-bound terminal equipment type simulated in the direction of the switching system. An inverse conversion is analogously required for signaling information that derive from the switching system and that is intended for the mobile terminal equipment. Thus, during a call connection it is not only the voice data that must be constantly looped via the "visited" radio exchange unit through to the "home" radio exchange unit; rather, the same is also true of the signaling information between mobile terminal equipment and "home" radio exchange unit.

SUMMARY OF THE INVENTION

It is an object of the present invention to provide a multi-cell radio system wherein a voice-accompanying signaling exchange between visited and home radio exchange unit is also assured for the aforementioned "extension connections".

This object is achieved with a multi-cell radio system wherein the periphery assemblies (SLMC) and/or radio exchange units (RE) are configured for packaging the signaling messages in user-to-user information of a digital connection or, respectively, wherein the periphery assemblies (SLMC) and/or radio exchange units (RE) have management ports ($PM_1$, $PM_2$) and are configured to allow the signal exchange via a signaling channel between two periphery assemblies (SLMC) or radio exchange units (RE) to sequence between management ports independently of the voice connections. It is also possible that external signaling lines are provided between the periphery assemblies (SLMC) or radio exchange units (RE). The present invention provides a voice-accompanying signaling in a simple and dependable way.

In general terms the present invention is a multi-cell radio system for a communication system with at least one exchange that has periphery assemblies and/or external radio exchange units for the connection of base stations. Each mobile terminal equipment is allocated to exactly one port of a periphery assembly and/or radio exchange unit on the basis of an identification information specific to the terminal equipment. Radio connecting paths to or, respectively, from mobile terminal equipment can be produced such that, regardless of the location of the terminal equipment, they always ensue with an auxiliary ("extension") connection via the port of the periphery assembly and/or radio exchange unit allocated to it. The periphery assemblies and/or radio exchange units are configured to package the signaling messages from and to the terminal equipment in user-to-user information of a digital connection.

Advantageous developments of the present invention are as follows.

The exchange is an ISDN exchange with a user-to-user performance feature. the signaling messages are allocated to the D-channel.

The present invention is also a multi-cell radio system for a communication system wherein periphery assemblies and/or radio exchange units have management ports and are configured to allow the signal exchange via a signaling channel between two periphery assemblies or radio exchange units to sequence between management ports independently of the call connections. The signaling channel proceeds within the exchange or within an exchange network. A single, central character channel between management ports is allocated to a plurality of call connections or to all call connections that are set up between two periphery assemblies or radio exchange units. A connectionless data transmission service is established between management ports independently of call connections. Alternatively, the voice channel is provided for the signaling exchange between management ports. The signaling exchange ensues upon employment of modems given an analog voice channel.

The present invention is also a multi-cell radio system for a communication system wherein external signaling lines are provided between the periphery assemblies or radio exchange units for the signaling exchange from and to the terminal equipment.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 is a block diagram of a third embodiment of the present invention.

DESCRIPTION OF THE PREFERRED EMBODIMENT

Figure 1:
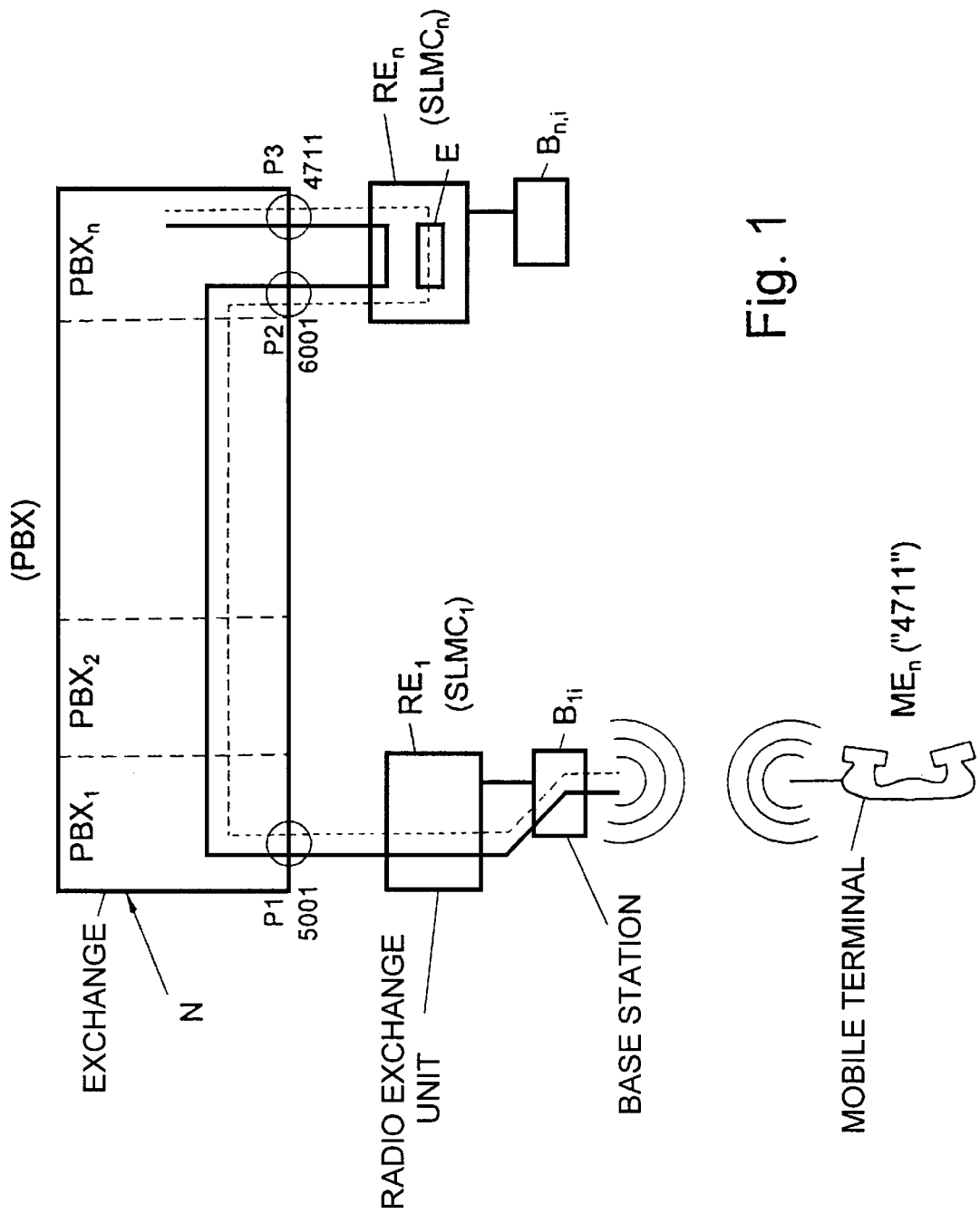
FIG. 1 is a block diagram of a first embodiment of the present invention.

FIG. 1 shows a network N composed of a plurality of exchanges $PBX_1 \ldots P_{PXBn}$. The invention, however, can be applied in the same way given a single exchange PBX with a plurality of radio exchange units or, respectively, periphery assemblies. Base stations $B_{li} \ldots B_{ni}$ are connected to the network N of exchanges $PBX_1 \ldots PBX_n$ via radio exchange units RE or, respectively, periphery assemblies $SLMC_1 \ldots SLMC_n$. A mobile terminal equipment $ME_n$ (telephone number "4711") that belongs to the "home" unit $RE_n$ ($SLMC_n$) is also shown. Call connections are thereby entered as solid lines and signaling connections are entered as broken lines.

The existence of an extension connection from a port P1 (telephone number "5001") to a port P2 (telephone number "6001") is assumed below, whereby the "visited" radio exchange unit $RE_1$ that receives signaling information from the terminal equipment $ME_n$ ("4711") is connected to port P1. When the subscriber is located in the area, that is, in the allocated cell or cells of his home radio exchange unit $RE_n$, then, of course, the "extension connection" is eliminated and the home radio exchange unit $RE_n$ takes the place of $RE_1$.

The home radio exchange unit $RE_n$ is connected to port 2 (telephone number "6001"). It must forward the subscriber signaling received from the mobile terminal equipment $ME_n$ at port 2 via the visited radio exchange unit $RE_1$ to the exchange or, respectively, the network N via the home port P3 of the transmitting mobile terminal equipment $ME_n$ ("4711"). A signaling must likewise be able to run in the opposite direction, whereby a protocol conversion is usually undertaken in both directions, for example in a protocol converter E. Since the signaling of the exchange to the mobile terminal equipment or, respectively, vice versa always runs over the same port P3, the in fact mobile terminal equipment $ME_n$ appears to be a stationary wire-bound terminal equipment from the point of view of the exchange. What can also be achieved via the protocol conversion is that the mobile terminal equipment $ME_n$ also appears as a terminal equipment types that is already known to the exchange.

In case of a digitized (ISDN) connection between P1 and P2, the exchange $PBX_1$ in the prior art then interprets and correspondingly evaluates a signaling of the radio exchange unit $RE_1$ or, respectively, periphery assembly SLMC1 received at port 1 as signaling of the appertaining (ISDN) wire-bound terminal equipment (emulated here) having the telephone number "5001" for controlling a connection from or, respectively, to port 1.

The connection from port P1 to the "home RE" for an outgoing connection must be set up by the radio exchange unit $RE_1$ on the basis of the subscriber identification of the mobile terminal equipment $ME_n$ received at the radio interface but not on the basis of the dialed numbers received from the mobile terminal equipment. The dialed numbers received from the mobile terminal equipment must not be forwarded to port 1 at the exchange PBX as dialed numbers of what is an emulated wire-bound terminal equipment here, but must be forwarded as dialed numbers of the emulated terminal equipment at port 3 ("home RE"). For example, a numerical information of the mobile terminal equipment $ME_n$ is discarded in the exchange in the activated call connection of the "extension connection" and could therefore never reach its destination. "Signal key" would in turn lead to an inquiry within the extension connection but not in the actual connection for port 3 ("4711") in the home exchange $PBX_n$. This would be just as undesirable as the discarding of a numerical information. The home RE sets up the extension connection for an incoming connection to a mobile terminal equipment to the current visited exchange RE on the basis of the location information stored therein.

The present invention then provides that the periphery assemblies and/or radio exchange units RE are configured to package the signaling messages in user-to-user information of a digital connection. Thus, for example, the dial information of the mobile terminal equipment are forwarded from port 1 to port 2 or, respectively, display information from port 2 to port 1 are forwarded to the mobile terminal equipment.

According to the ETSI Standard ("European Telecommunication Standardization Institute"), the user-to-user info (UUI) is provided as "supplementary service" of an ISDN exchange and can be utilized for the realization of the invention in order to send the signaling messages within UUI information elements packaged with messages in the D-channel to the respective partner.

Figure 2:
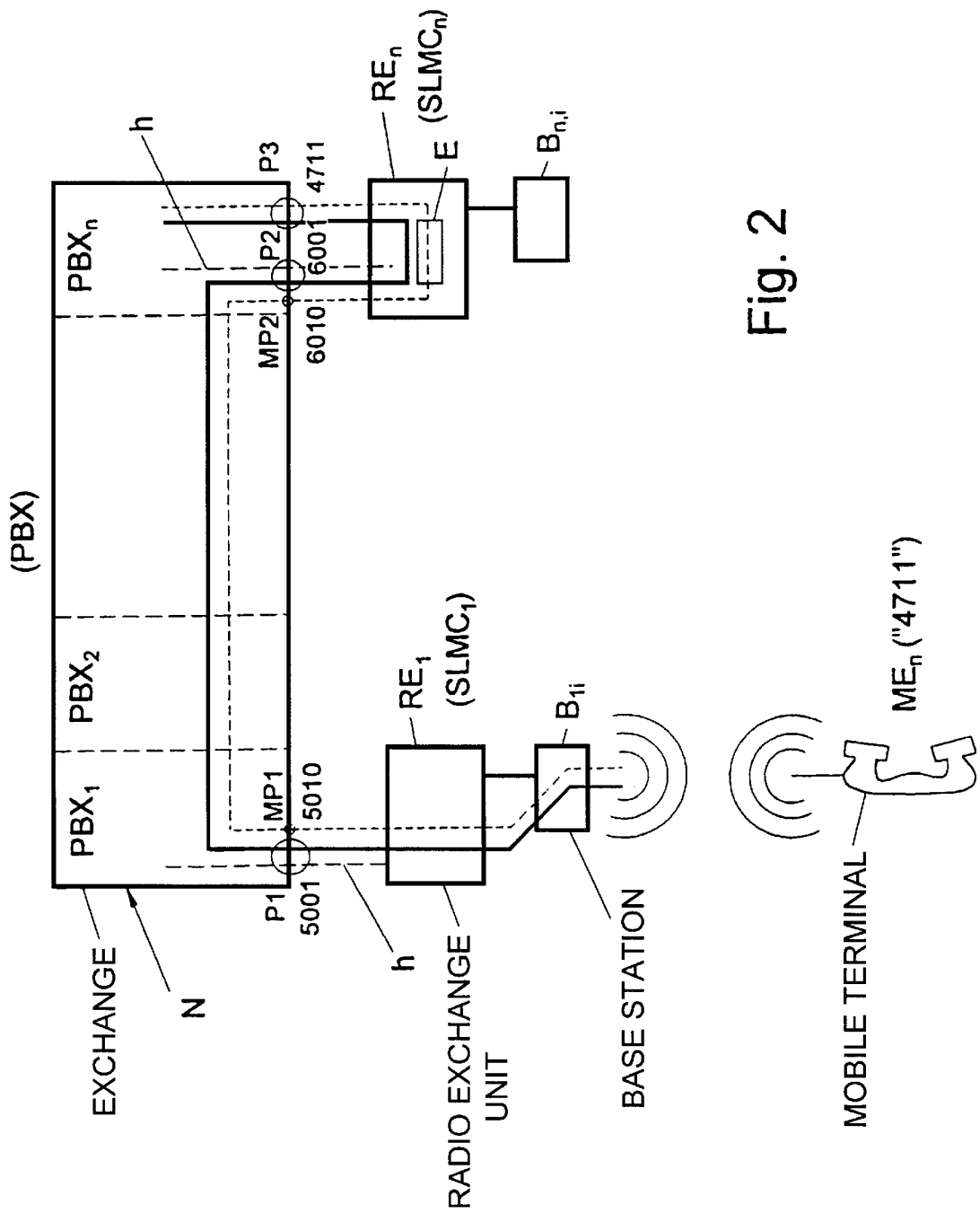
FIG. 2 is a block diagram of a second embodiment of the present invention.

According to the present invention, other measures can also be provided for call-accompanying signaling transmission. In an illustration similar to FIG. 1, FIG. 2 shows the use of specific management ports at the periphery assemblies SLMC or, respectively, radio exchange units RE of the PBX or, respectively, of the PBX network N that are referenced here as MP1 "5010" and MP2 "6010". A management connection within the PBX or, respectively, the PBX network N is entered between these ports, this serving for the signaling transfer between the ports for which an extension connection (of the voice channel) exists between two radio exchange units $RE_1$, $RE_n$ or, respectively, two periphery assemblies $SLMC_1$, $SLMC_n$. A single connection as central character channel between management ports MP1, MP2 can thereby be allocated to a plurality of call connections or to all call connections as well. Only a single call connection, however, is entered in FIG. 2. The signaling via port 1 or, respectively, port 2, referenced h in FIGS. 2 and 3, is only used for the call setup or, respectively, cleardown of the extension connection but not for the signaling transfer to or, respectively, from the mobile terminal equipment.

The voice channel within the management connection can be utilized for the signaling exchange, for example given digital connections such as ISDN with a currently standard gross transmission rate of 64 kbit/s. Given analogous management connections, the voice channel can likewise be utilized for the signaling exchange by employing modems.

A connection less data communication service ("connectionless service", "datagram service"), however, can also be utilized for the signaling exchange between the management ports, assuming the exchange offers this performance feature.

When the increased cabling outlay is accepted, then separate signaling lines s that are external with respect to the exchanges PBX or the network N can also be provided for the signaling exchange between the radio exchange units RE or periphery assemblies SLMC, as shown schematically with broken lines in FIG. 3.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A multi-cell radio system for a communication system with at least one exchange that has periphery assemblies and/or external radio exchange units for connection of base stations, comprising:

mobile terminal equipment, each of said mobile terminal equipment being respectively allocated to a respective port of a periphery assembly and/or radio exchange unit identification information specific to the terminal equipment;

radio connecting paths to or, respectively, from mobile terminal equipment such that, regardless of the location the terminal equipment, said paths always ensue with an auxiliary connection via the respective port of the periphery assembly and/or radio exchange unit allocated thereto; and the periphery assemblies and/or radio exchange units being configured to package signaling messages from and to the terminal equipment in user-to-user information provided as a supplementary service of an ISDN exchange, said user-to-user information being packaged with messages to a respective partner of a digital connection.

2. The multi-cell radio system according to claim 1, wherein the signaling messages are allocated to a D-channel.

3. A multi-cell radio system for a communication system with at least one exchange that has periphery assemblies and/or external radio exchange units for connection of base stations, comprising:

mobile terminal equipment, each of said mobile terminal equipment being respectively allocated to a respective port of a periphery assembly and/or radio exchange unit identification information specific to the terminal equipment;

radio connecting paths to or, respectively, from mobile terminal equipment such that, regardless of the location of the terminal equipment, said paths always ensue with an auxiliary connection via the respective port of the periphery assembly and/or radio exchange unit allocated thereto;

the periphery assemblies and/or radio exchange units having management ports and configured to allow signal exchange via a signaling channel between two periphery assemblies or radio exchange units to sequence between management ports independently of call connections;

the signaling channel proceeds within one of the exchange and an exchange network; and a single, central character channel between management ports is allocated to a plurality of call connections or to all call connections that are set up between two periphery assemblies or radio exchange units.

4. The multi-cell radio system according to claim 3, wherein a connectionless data transmission service is established between management ports independently of call connections.

5. The multi-cell radio system according to claim 3, wherein a voice channel is provided for signaling exchange between management ports.

6. The multi-cell radio system according to claim 5, wherein the signaling exchange ensues upon employment of modems given an analog voice channel.

* * * * *